G. P. LUEDKE.

THRASHING MACHINE.

APPLICATION FILED AUG. 2, 1921.

Reissued June 13, 1922. 15,384.

6 SHEETS—SHEET 1.

Inventor
G. P. Luedke
By Sheridan, Jones, Sheridan & Smith Atty's.

G. P. LUEDKE.
THRASHING MACHINE.
APPLICATION FILED AUG. 2, 1921.
Reissued June 13, 1922.
15,384.
6 SHEETS—SHEET 2.
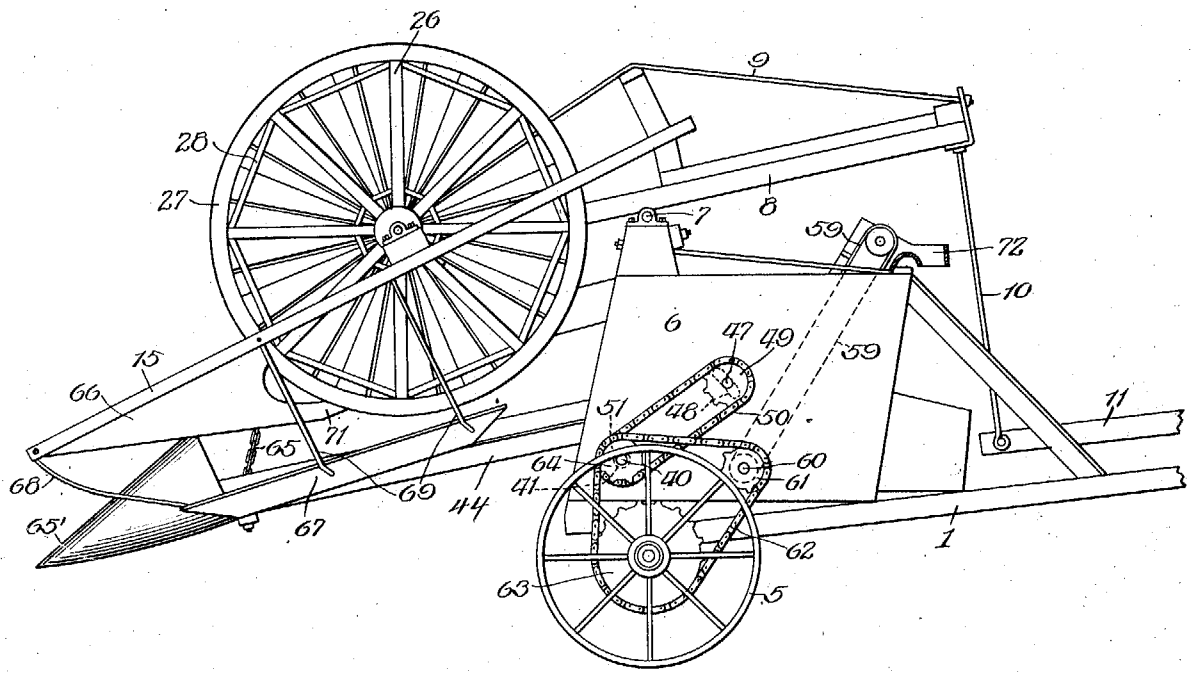
Inventor
G. P. Luedke
By Sheridan, Jones, Sheridan & Smith Atty's.

BEST AVAILABLE COPY

G. P. LUEDKE.

THRASHING MACHINE.

APPLICATION FILED AUG. 2, 1921.

Reissued June 13, 1922. 15,384.

6 SHEETS—SHEET 3.

Inventor
G. P. Luedke

By Sheridan, Jones, Sheridan & Smith Attys

G. P. LUEDKE.

THRASHING MACHINE.

APPLICATION FILED AUG. 2, 1921.

Reissued June 13, 1922.

15,384.

6 SHEETS—SHEET 4.

Inventor
G. P. Luedke

By Sheridan, Jones, Sheridan & Smith Atty's

G. P. LUEDKE.

THRASHING MACHINE.

APPLICATION FILED AUG. 2, 1921.

Reissued June 13, 1922.

15,384.

6 SHEETS—SHEET 5.

Inventor
G. P. Luedke
By Sheridan, Jones, Sheridan & Smith
Att'ys.

G. P. LUEDKE.

THRASHING MACHINE.

APPLICATION FILED AUG. 2, 1921.

Reissued June 13, 1922.

15,384.

6 SHEETS—SHEET 6.

Inventor
G. P. Luedke

By Sheridan, Jones, Sheridan & Smith Attys

UNITED STATES PATENT OFFICE.

GUSTAV PAUL LUEDKE, OF SPRINGFIELD, ILLINOIS.

THRASHING MACHINE.

15,384. Specification of Reissued Letters Patent. Reissued June 13, 1922.

Original No. 1,379,112, dated May 24, 1921, Serial No. 325,856, filed September 24, 1919. Application for reissue filed August 2, 1921. Serial No. 489,389.

*To all whom it may concern:*

Be it known that I, GUSTAV PAUL LUEDKE, a citizen of the United States, residing at Springfield, in the county of Sangamon and State of Illinois, have invented a new and useful Thrashing Machine, of which the following is a specification.

This invention relates to machines particularly designed for use in harvesting the seeds of sweet clover although it can also be used for harvesting other kinds of seeds and grains.

It has been the practice, heretofore, when harvesting seed, to first cut the vegetation by means of a suitable harvester, convey the cut material to a thresher, and then, if the vegetation is to be used for the purpose of enriching the soil, it has been carried back to the field, spread thereover, and turned under. This practice is objectionable because of the considerable loss of seed during the cutting, carrying and thrashing operations, and because of the loss of time and labor resulting from the carrying of the cut material and necessary use of different machines for the different operations.

One of the objects of the present invention is to provide a machine which can be propelled through the growing vegetation and will operate thereon to separate the ripe seeds from the stalks and stems, there being means for gathering the seeds and conveying them to sacks or other containers, so that the vegetation will be left standing in the field with the seeds removed therefrom and ready to be turned under whenever desired.

A further object is to provide simple and efficient means for separating the seeds from their stems without injury to the plants, said plants being left standing where they can be again acted on by the machine at a later date to remove seeds that have ripened subsequently to the first operation.

Another object is to provide means for directing the separated seeds to suitable conveying means.

A still further object is to provide means for adjusting the machine quickly to the height of the vegetation.

With the foregoing and other objects in view, which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings one form of the invention has been shown.

In said drawings—

Fig. 2 is an elevation of a portion of the machine showing the opposite side thereof.

Figure 1:
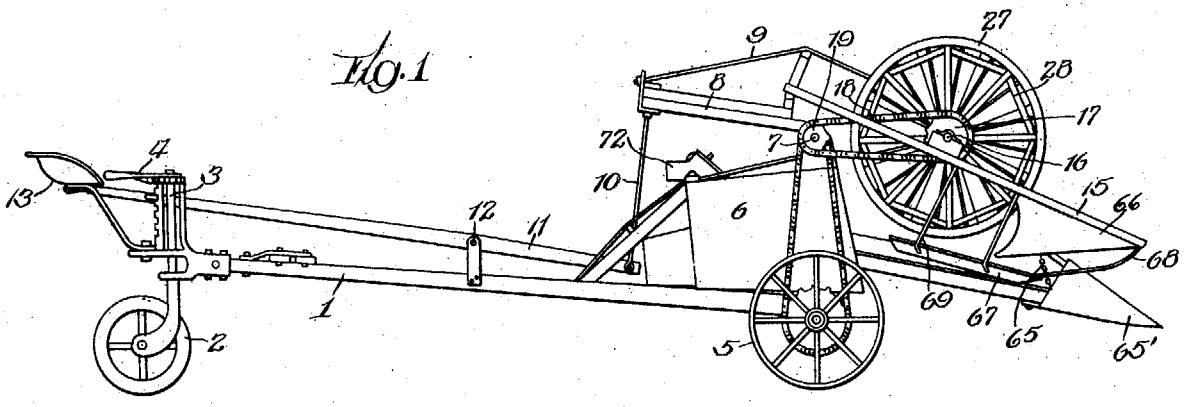
Figure 1 is a side elevation of the machine.
Figure 9:
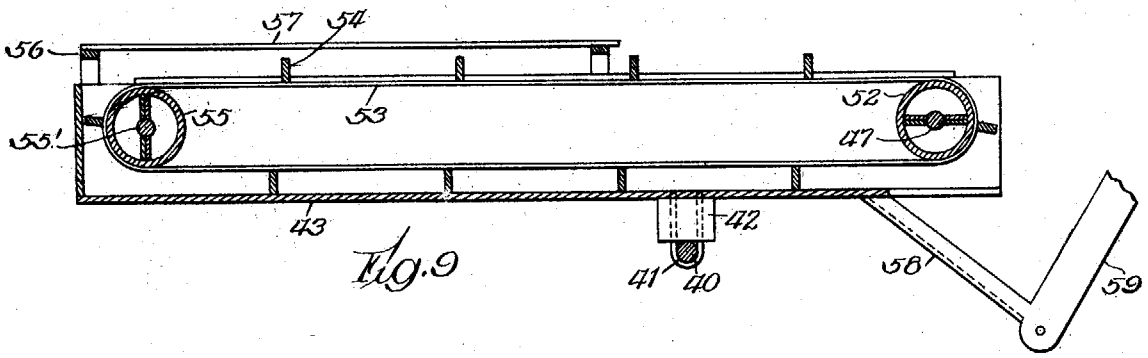
Fig. 9 is an enlarged section through one of the pans and adjacent parts.
Figure 3:
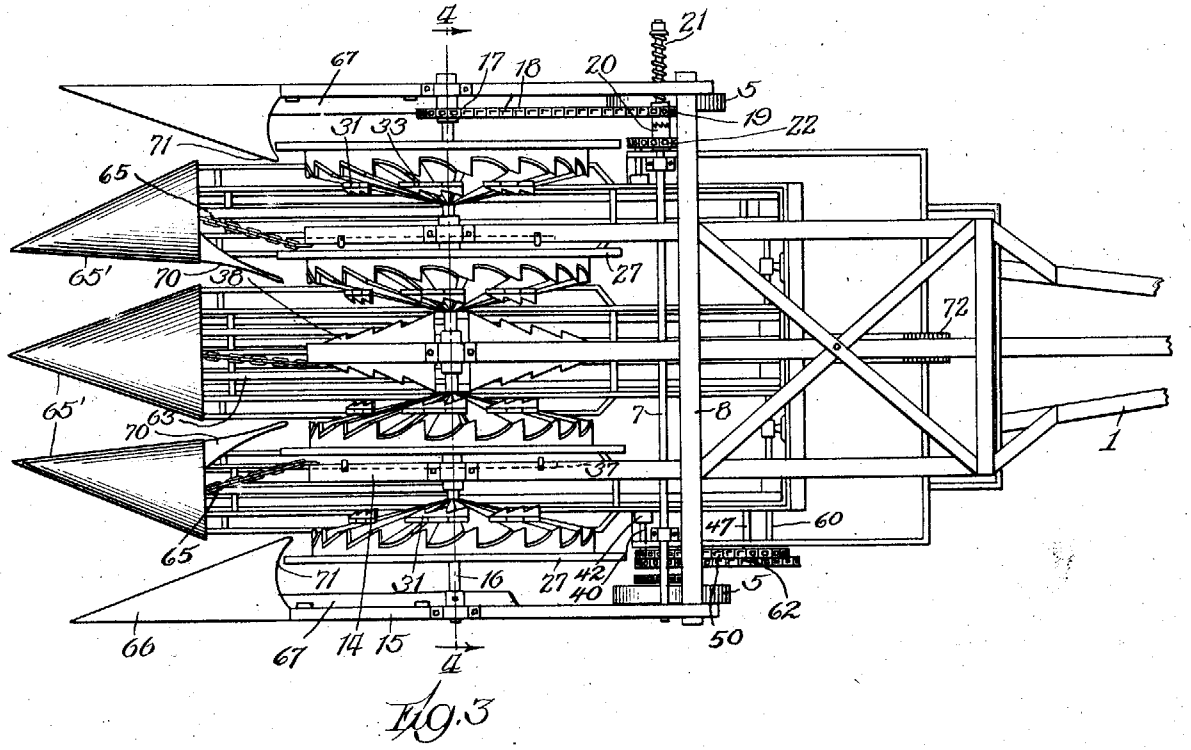
Fig. 3 is a plan view of the structure shown in Fig. 2.
Figure 4:
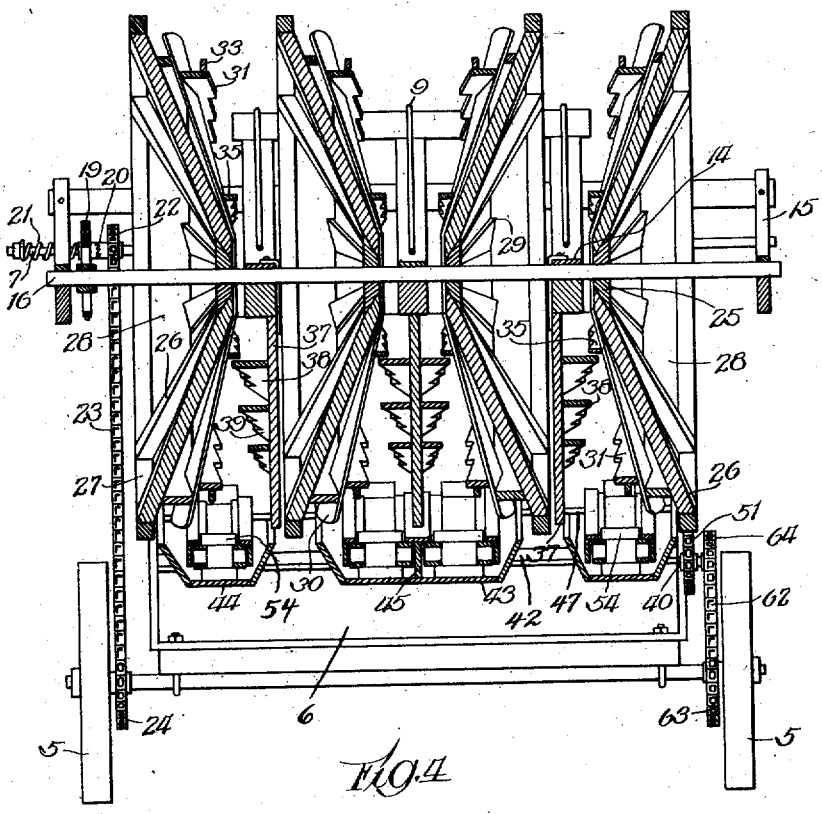
Fig. 4 is a section on line 4—4, Fig. 3.
Figure 6:
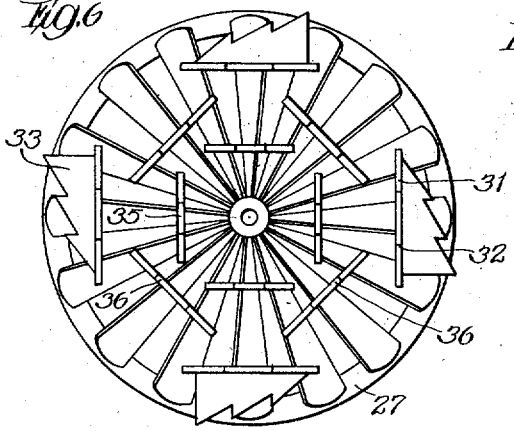
Fig. 6 is an elevation of one of the thrashing wheels and showing the active face thereof.
Figure 7:
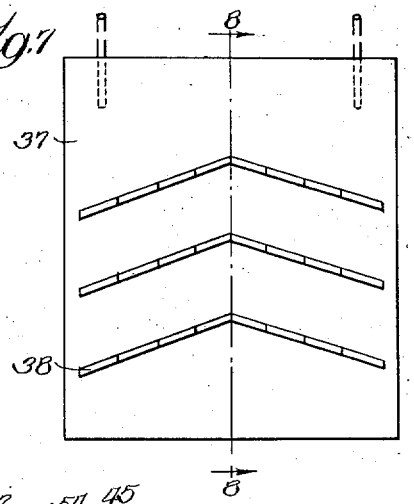
Fig. 7 is a face view of one of the thresher guards.
Figure 10:
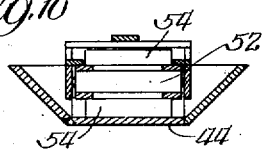
Fig. 10 is a section on line 10—10, Fig. 5.
Figure 11:
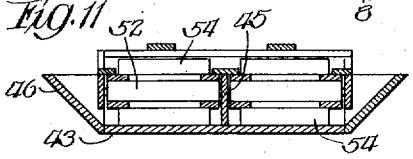
Fig. 11 is a section on line 11—11, Fig. 5.
Figure 5:
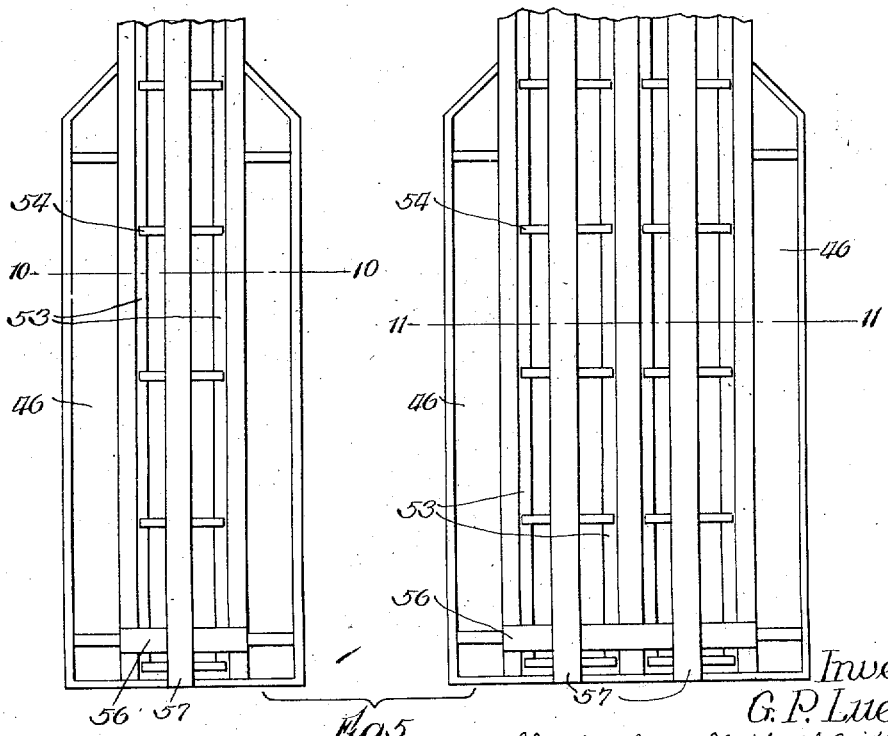
Fig. 5 is a plan view of the conveyers and their pans.
Figure 12:
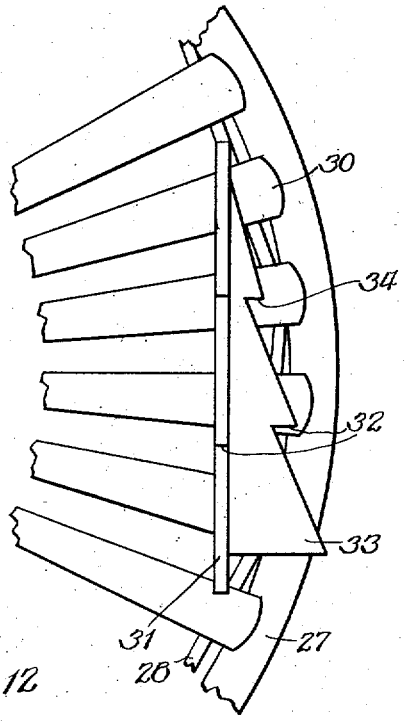
Fig. 12 is a face view of a portion of one of the revoluble thrashing elements.
Figure 13:
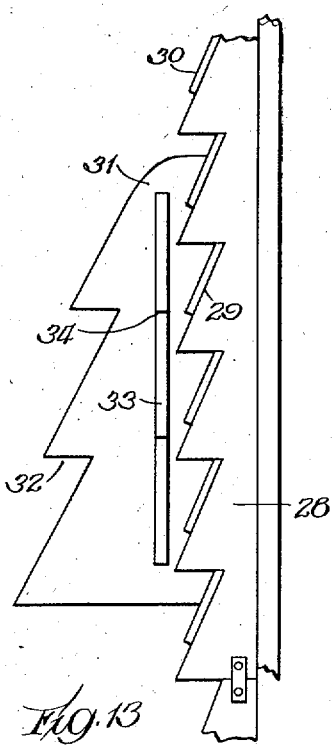
Fig. 13 is an edge view of the structure shown in Fig. 12.
Figure 8:
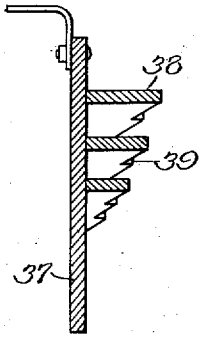
Fig. 8 is a section on line 8—8, Fig. 7.

Referring to the figures by characters of reference, 1 designates an elongated frame which can be formed of connected forwardly diverging beams, as shown, and the rear end of this frame is supported by a steering wheel 2 the stem 3 of which can be turned by a lever 4 or in any other desired manner.

The front portion of the frame 1 is supported by wheels 5 erected on this front portion and between the wheels is a housing 6 which can be of any desired construction. A transverse shaft 7 is supported on the housing at the front of the top thereof and a tiltable frame 8 is mounted to swing on this shaft, said frame being extended forwardly and rearwardly beyond the shaft and being suitably reinforced, as by means of a truss 9. The back portion of the frame is connected by a rod 10 to the front end of a lever 11 which is fulcrumed on the frame 1, as shown at 12 and extends rearwardly to a point where it can be conveniently grasped and operated by the occupant of a seat 13 carried by the rear portion of the frame 1. Thus the driver can readily steer the machine by means of the arms 4 and can, at the same time operate the lever 11 to swing the frame 8 and thereby raise or lower the front end of the frame.

The frame 8 has parallel arms 14 as shown and is also provided with forwardly and downwardly inclined side arms 15. On these arms 14 and 15 is journaled a transverse shaft 16 to which is secured a sprocket 17 receiving motion, through a chain 18, from another sprocket 19. This sprocket is mounted on the shaft 7 and is normally coupled thereto by a clutch 20 having co-operating ratchet teeth. A spring 21 presses against the sprocket to hold the clutch members normally in engagement and the teeth of the clutch members are so pitched that when the machine is propelled forwardly the shaft 7 will transmit motion through the clutch, sprockets and chain to the shaft 16 but, when the machine is stopped, the clutch member on the shaft 7 will slip relative to the clutch member on the sprocket 19 during the continued rotation of shaft 16 due to momentum. Shaft 7 receives its motion through a sprocket 22 secured thereto, a chain 23, and a sprocket 24 secured to one of the wheels 5.

Secured to the shaft 16 so as to rotate therewith are thrashing wheels of peculiar construction, those wheels at one side of the center of the machine being arranged oppositely to the wheels at the other side of the center. Each wheel includes a hub 25 from which radiate spokes 26 connected to a rim 27, the said hub and rim being disposed in different planes of rotation, as shown. Secured to and between the spokes, at their outer ends and close to the rim 27 are spacing blocks 28 the free longitudinal edges of which are provided with angular recesses 29, the advancing wall of each recess being perpendicular to the plane of rotation of the wheel while the other wall of each recess is inclined, as shown. Secured to the inclined walls of the recesses 29 are the outer end portions of fan blades 30 the inner ends of which are connected to the hub 25. These blades are so pitched that when the wheels are rotated they will set up lateral currents of air.

Secured to and extending transversely of the blades 30 of each wheel close to the outer ends thereof are thrashing blades 31 each of which is provided in its free longitudinal edge, with angular recesses 32, the advancing wall of each recess being perpendicular to the plane of rotation of the wheel while the other wall of each recess is inclined, as shown. Erected on each of these blades 31 are supplemental blades 33 the sides of which are parallel with the plane of rotation. These supplemental blades are tapered slightly in their direction of rotation and are provided, in their free longitudinal edges, with notches or recesses 34 similar to the recesses 32. Mounted on the fan blades 30 near the hub of each wheel are thrashing blades 35 similar to but smaller than the blades 31 and intermediate thrashing blades 36 are also secured to the blades 30 and are similar to the blades 35. The blades 36 are disposed opposite the spaces between the blades 31 and the blades 35 are disposed opposite the spaces between the blades 36.

Supported from the arms 14 of the frame 8 are guards 37, one guard being located between the two intermediate wheels while another guard is arranged close to the outer side of each of said intermediate wheels. The intermediate guard 37 is provided on each face with superposed thrashing fins 38 each of which is in the form of an inverted V gradually increasing in its width from its ends to its apex. The free longitudinal edges of the fins are provided with recesses 39 the walls of which converge as shown. The rear walls of the recesses in the front half of each fin are inclined laterally and rearwardly while the front walls of the recesses in the rear portions of the fins are similarly inclined. All remaining walls of the recesses are extended laterally perpendicularly to the face of the guard. The fins 38 on the two sides of the central guard 37 are extended toward the respective intermediate thrashing wheels and on the outer sides of the other guards 37 the fins are extended laterally toward the outer thrashing wheels. In every case the upper fins are wider than the fins directly thereunder, and the lower fins are narrower than the remaining fins. This is shown clearly in the drawings.

A transverse shaft 40 is supported by the housing 6 and has a tube or sleeve 41 mounted for rotation thereon in the housing. To this sleeve is secured a transverse beam 42 on which are securely mounted parallel troughs 43 and 44. The trough 43 is extended longitudinally under the space between the intermediate thrashing wheels and is divided by a longitudinal partition 45 into separate channels. The front portions of the sides of this trough as well as of the troughs 44 (which are extended under the spaces between the side thrashing wheels and the side guards 37) are flared laterally and upwardly, as shown at 46 but those portions of the troughs which extend rearwardly beyond the thrashing wheels are provided with vertical walls so that the spaces between the troughs are wider at these points, thereby to allow the vegetation to expand after being acted on in the manner hereinafter described. A transverse shaft 47 is journaled in the rear portions of the troughs and one end thereof extends through an arcuate slot 48 in one wall of the housing 6. A sprocket 49 is secured to the projecting end of this shaft and receives motion through a chain 50 from a sprocket 51 secured to the shaft 40. Pulleys 52 or the like are secured to the shaft 47 and are located in the rear ends of the respective troughs and are engaged by conveyers extending longitudinally of the troughs. Each conveyer consists of parallel belts 53 connected by cross strips 54 adapted to scrape along the bottoms of the troughs so as to drag seeds along the troughs to the open rear ends thereof. Pulleys 55 are located in the front ends of the troughs on shaft 55′ to support the conveyers. Cross strips 56 are erected at the front ends and at intermediate points above the troughs and support longitudinal guard rails 57 located above the centers of the troughs and adapted to prevent vegetation from sagging into the troughs and becoming entangled with the conveyers. An inclined board 58 or the like is employed for directing material from the open rear ends of the troughs 43 and 44 to the lower end of an elevator 59. A shaft 60 is adapted to operate this elevator and has a sprocket 61 and receives motion through a chain 62 from a sprocket 63 connected to one of the wheels 5. This same chain also engages the sprocket 64 attached to the shaft 40. Chains 65 or other flexible devices support the front ends of the troughs from the front ends of the arms 14 so that when the frame 8 is tilted in the manner hereinbefore described and the wheels of the thrashing mechanism are raised or lowered, a corresponding movement will be imparted to the troughs which will swing about their fulcrum 41.

For the purpose of gathering the vegetation and directing it properly into the spaces between the troughs and between the thrashing elements forwardly tapering separators 65′ are extended from the front ends of the troughs 43 and 44 and tapered guide fingers 66 are extended forwardly from the arms 15. Guards 67 are supported under the arms 15 and are connected thereto by front arcuate rods 68 and by hangers 69.

The manner of steering, adjusting and driving the various parts of the machine has already been described. When the machine is propelled forwardly, either by horses connected to the rear portion of the frame 1 or by a tractor suitably positioned, the separators 65′ and the fingers 66 will wedge into the standing vegetation and separate it into rows which will be received between the troughs 43 and 44. A deflecting finger 70 is supported above the back end of each side separator 65′ and extends rearwardly, the two fingers converging as shown. Thus as the rows of vegetation are received between the troughs they will be pressed laterally by the fingers 70 out of the paths of the blades 31 and toward the guard 37 at the center of the machine. Projecting portions 71 are provided on the rear ends of the fingers 66 and serve to press certain of the rows of vegetation laterally out of the paths of the thrashing blades of the side thrashing wheels and toward the side guards 37. Thus as the machine moves forwardly and the thrashing wheels rotate, the thrashing blades 31 will not engage the standing vegetation until they have passed downwardly and have begun to travel rearwardly. At this time the standing rows of vegetation have been released from the rear ends of the fingers 70 and the projections 71 and have thus spread out between the wheels and the guards 37. Consequently as the blades 31 as well as the thrashing blades 35 and 36 continue their rearward movement during the rotation of the thrashing wheels they will engage the stalks, which are stiff, and drag them over the fins 38 thereby bending the stalks into numerous angles while the seeds are beaten off by the thrashing blades. The recesses in the thrashing blades and in the fins subject the stalks to intermittent compression and release so that choking of the machine is prevented and the recesses in the fins likewise hold up the stalks during the thrashing operation. Immediately after the vegetation has been acted upon by the blades on the wheels it arrives between the narrow portions of the troughs where it can spread out and thus allow the machine to withdraw therefrom easily and without pulling. The stalks will thus be left standing and can be again operated on at a later time after other seeds or grains have ripened.

During the thrashing action which has just been described, the fan blades 30 set up light currents of air toward the guards 37 so that the seeds or grains, as loosened and detached from the stalks, will be blown laterally to fall into the respective troughs and the conveyers in these troughs will carry the material rearwardly to the elevator which, in turn, will elevate said material to a spout 72 where it can be discharged into sacks.

By providing the guards 37 with fins 38 located at different elevations and by providing the thrashing wheels with blades located at different distances from the centers of the wheels, all seed or grain bearing portions of the stalks will be acted upon and by arranging the blades 31 of different widths, as shown the denser growth near the surface of the ground will be subjected to substantially the same degree of compression during the thrashing operation as will the less compact growth at the tops of the stalks. As a result of this uniform compression of the vegetation there is no danger of the machine becoming choked while the material is being acted upon.

Having thus described the invention, what is claimed is:—

1. A thrashing machine including a revoluble thrashing element, another thrashing element at one side thereof, said elements having their cooperating faces converging toward the axis of rotation of the revoluble element.

2. A thrashing machine including a revoluble thrashing element, a stationary thrashing element cooperating therewith, the cooperating faces of said elements converging toward the axis of rotation of the revoluble element.

3. The combination with a portable structure of stationary thrashing elements extending longitudinally of the structure, wheels having side faces cooperating therewith to thresh material and constituting fans, said wheels being revoluble about an axis extending transversely of the structure, collecting troughs below the thrashing elements for receiving separated material blown by the wheels, and means for conveying material from the trough.

4. The combination with the portable structure, of stationary thrashing elements including super-posed fins of varying widths, each fin having recesses in its free edge, thrashing wheels cooperating with the thrashing elements, each wheel including radially spaced non-aligning thrashing blades extending laterally therefrom toward the adjacent thrashing element.

5. The combination with a portable structure, of a stationary thrashing element including super-posed fins of different widths, each fin being tapered toward its ends and being angular from end to end, there being recesses in the free edge of each fin, and thrashing wheels cooperating with said elements, each wheel including radially spaced non-aligning thrashing blades extending laterally toward the adjacent thrashing element, each blade having notches in its free edge.

6. The combination with a portable structure, of a stationary element including super-posed angular fins, each fin being tapered toward its ends and having notches in its free edge, said fins being of different widths, and a thrashing wheel cooperating with each of said elements and including radially spaced non-alining thrashing blades having notches in their free edges, said blades being straight from end to end and extending laterally toward the thrashing element adjacent thereto, and supplemental blades outstanding from and extending longitudinally of certain of the blades on the wheel.

7. The combination with a portable structure, and means carried thereby for dividing standing vegetation into rows, of cooperating fixed and revoluble thrashing elements for receiving the rows of vegetation therebetween, means for deflecting the vegetation laterally from the paths of the revoluble elements while entering between the fixed and revoluble thrashing elements, and means upon the revoluble elements for engaging the vegetation when released from the deflecting means and working it along the fixed thrashing means to separate the seeds from the stalks.

8. In a thrashing machine of the character described, a thrashing wheel having radial fan blades and radially spaced thrashing blades extending transversely of the fan blades.

9. In a thrashing machine of the character described, a thrashing wheel having radially spaced non-alining thrashing blades extending laterally from one face thereof, each blade having notches within the free edge thereof.

10. In a thrashing machine, a thrashing wheel including radial fan blades, radially spaced thrashing blades extending transversely of the fan blades and extending laterally therefrom, said thrashing blades having notches in their free longitudinal edges.

11. In a thrashing machine, a thrashing wheel having radially spaced non-alining thrashing blades extending laterally from one face, there being notches in the free edge of each blade, supplemental thrashing blades erected upon the outer faces of and extending longitudinally of certain of the thrashing blades, said supplemental blades having notches in their free edges.

12. In a thrashing machine of the class described, a stationary thrashing element including super-posed angular fins of different widths, each fin being tapered toward its ends and having recesses in its free edge.

13. A machine for thrashing standing grain, including cooperating fixed and revoluble elements having therebetween a space extending longitudinally of the machine for receiving standing stalks, means for actuating the revoluble elements to impart a lateral oscillation to the stalks to shake the ripe seeds therefrom and fan blades upon one side of each of the revoluble elements for blowing the separated seeds against the fixed element.

14. A machine for thrashing standing grain, including cooperating fixed and revoluble elements having therebetween a space extending longitudinally of the machine for receiving standing stalks, means for actuating the revoluble elements to impart a lateral oscillation to the stalks to shake the ripe seeds therefrom and fan blades upon one side of each of the revoluble elements for blowing the separated seeds against the fixed element, and means for collecting seeds from the fixed element.

15. A machine for thrashing standing grain, including a fixed, longitudinally extending guard, thrashing elements thereon, revoluble thrashing elements cooperating with the elements on the guard to impart a lateral oscillation to standing stalks received between the fixed and revoluble thrashing elements, and fan blades upon one side of each of the revoluble thrashing elements for blowing separated seeds against the guard, and means for collecting seeds from the guard.

16. A machine for thrashing standing grain, including a longitudinally extending guard, superposed angular, recessed thrashing elements thereon, a revoluble wheel, superposed recessed thrashing elements on the wheel and cooperating with said elements on the guard to impart a lateral vibration to standing stalks to shake ripe seeds therefrom, fan blades on one side of the wheel for blowing the separated seeds against the guard, and means for collecting the seeds from the guard.

17. In a thrashing machine, seed-collecting means, a plurality of coacting thrashing members together forming an open thrashing zone, and means for creating and directing a blast of air into said zone in such wise as to force the threshed grain into said collecting means.

18. In a machine for thrashing standing grain, a thrashing wheel, a plurality of thrashing elements carried by said wheel, and means also carried by said wheel for creating a current of air which aids in the collection of the seeds after the latter have been separated from the stalks.

19. In a machine for thrashing standing grain, a collection trough, a thrashing wheel, thrashing elements carried by the latter, means also carried by said wheel for creating a current of air which blows the seeds laterally away from said wheel as the same are separated from the stalks, and means for deflecting the seeds thus acted upon into said trough.

20. In a thrashing machine, a frame, a plurality of thrashing elements mounted on an axis disposed transversely of said frame, said elements being separated to form thrashing zones, collecting troughs located below said zones and extending longitudinally of said frame, and blower means associated with said thrashing elements for assisting in depositing the seeds in said troughs.

21. In a machine for thrashing standing grain, cooperating thrashing elements spaced apart to provide thrashing zones, individual collecting means located beneath said zones for collecting the seeds as the latter are separated from the stalks, and means in advance of said zones for dividing the standing grain into rows.

22. In a machine for thrashing standing grain, cooperating thrashing elements spaced apart to provide thrashing zones, individual collecting means located beneath said zones for collecting the seeds as the latter are separated from the stalks, means in advance of said zones for dividing the standing grain into rows, a receptacle common to all of said collecting means, and means associated with the latter for conveying the seeds into said receptacle.

23. In a machine for thrashing standing grain, a frame, a plurality of spaced apart cooperating thrashing elements carried by the frame and forming thrashing zones arranged in succession transversely thereof, and seed-collecting and conveying means extending longitudinally of the frame below said zones.

24. In a machine for thrashing standing grain, a frame, a plurality of spaced apart cooperating thrashing elements carried by the frame and forming thrashing zones arranged in succession transversely thereof, seed-collecting and conveying means extending longitudinally of the frame below said zones, and means associated with a portion of said thrashing elements for setting up currents of air which aid in the collection of the threshed grain.

25. In a machine of the class described, revoluble thrashing means, stationary thrashing means, collecting means, and means associated with said revoluble thrashing means for setting up lateral air currents which act to force the threshed grain against said stationary thrashing means and into said collecting means.

26. In a thrashing machine, a thrashing wheel including radial fan blades, and radially spaced thrashing blades extending transversely of the fan blades and projecting laterally therefrom.

27. A machine for thrashing standing grain, including a longitudinally extending guard, thrashing elements thereon, a revoluble wheel, thrashing elements upon the wheel and cooperating with the elements on said guard to impart a lateral vibration to the standing stalks to shake ripe seeds therefrom, fan blades on one side of the wheel for blowing the separated seeds against the guard, and means for collecting the seeds from the guard.

28. In a thrashing machine, a plurality of longitudinal troughs, coacting thrashing members above said troughs, conveyors movable in said troughs, and means for depositing the threshed grain in said troughs.

29. In a thrashing machine, a plurality of longitudinal troughs, means for thrashing grain and depositing the same in said troughs, and means in advance of said thrashing means for dividing the grain into rows.

30. In a thrashing machine, a trough, conveying means movable therein, a stationary thrashing element supported above said trough, a movable thrashing element coacting with said stationary element, and fan blades carried by said movable element for blowing the separated seeds against the said stationary element and into said trough.

31. In a thrashing machine, a supporting frame, stationary thrashing elements carried by said frame, revoluble blower wheels mounted on said frame, and thrashing elements carried by said wheels and adapted to coact with said stationary elements upon rotation of said wheels.

32. In a thrashing machine, coacting thrashing elements, a collection trough located beneath said elements, means for deflecting the threshed grain into said trough, and blower means for forcing the threshed grain against said deflecting means.

33. A thrashing machine comprising spaced apart members providing an open thrashing zone, means for thrashing standing grain in said zone, means for receiving the seeds as the latter are separated from the stalks, and means for forcing a current of air through said zone in such wise as to direct said seeds into said receiving means.

34. A thrashing machine comprising spaced apart members providing an open thrashing zone, means for thrashing standing grain in said zone, means for receiving the seeds as the latter are separated from the stalks, and means for forcing a current of air through said zone in such wise as to direct said seeds into said receiving means, said last-named means forming a part of said thrashing means.

35. In a machine for thrashing standing grain, cooperating thrashing elements spaced apart to provide thrashing zones, collecting members underlying said zones and extending longitudinally of said machine, and means for guiding the standing grain in rows between said members in its passage to said zones.

In testimony whereof, I have subscribed my name.

GUSTAV PAUL LUEDKE.